US012205415B2

(12) United States Patent
Ashbourne et al.

(10) Patent No.: US 12,205,415 B2
(45) **Date of Patent: *Jan. 21, 2025**

(54) INFRASTRUCTURE TO SUPPORT REAL-TIME REVIEW OF EVENTS

(71) Applicant: EMBARK TRUCKS INC., San Francisco, CA (US)

(72) Inventors: Paul Ashbourne, San Francisco, CA (US); Liam Benson, San Francisco, CA (US); Konstantine Mushegian, San Francisco, CA (US)

(73) Assignee: EMBARK TRUCKS INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/141,089

(22) Filed: Apr. 28, 2023

(65) Prior Publication Data

US 2024/0037996 A1 Feb. 1, 2024

Related U.S. Application Data

(63) Continuation of application No. 17/874,915, filed on Jul. 27, 2022, now Pat. No. 11,645,877.

(51) Int. Cl.
*G07C 5/00* (2006.01)
*G07C 5/08* (2006.01)

(52) U.S. Cl.
CPC .......... *G07C 5/008* (2013.01); *G07C 5/0816* (2013.01)

(58) Field of Classification Search
CPC ...... G07C 5/008; G07C 5/0816; G07C 5/085; G07C 5/0808
USPC .......................................... 701/31.4
See application file for complete search history.

(56) References Cited

U.S. PATENT DOCUMENTS

2012/0041638 A1* 2/2012 Johnson .............. G06F 11/3003 701/33.1
2016/0265930 A1* 9/2016 Thakur ................ G05D 1/0088
2021/0192867 A1* 6/2021 Fang .................... G07C 5/0816

OTHER PUBLICATIONS

892 Form dated Oct. 5, 2022 which was issued in connection with U.S. Appl. No. 17/874,915.
Notice of Allowance dated Feb. 3, 2023 which was issued in connection with U.S. Appl. No. 17/874,915.

* cited by examiner

*Primary Examiner* — Tyler D Paige
(74) *Attorney, Agent, or Firm* — McDermott Will & Emery LLP

(57) ABSTRACT

A system and method including receiving an indication of an occurrence of an event associated with the operation of an autonomous vehicle; determining at least one action to be performed, the at least one action including a data request for a specified subset of stored data associated with the operation of the autonomous vehicle from a memory; generating an output including the specified subset of data; and transmitting the specified subset of data to a remote monitoring system.

20 Claims, 10 Drawing Sheets

700

705 710 715 720 725

| EVENT TYPE | EVENT ID | START TIME | END TIME | DATA TYPE |
|---|---|---|---|---|
| INTERVENTION | E001 | E(-10 sec) | E(+10 sec) | CAM, LID, GPS, H |
| MANUAL/REMOTE | E002 | E(-30 sec) | E(-20 sec) | CAM, GPS, H |
| MANUAL/DRIVER | E003 | E(-60 sec) | E(-15 sec) | CAM, LID, GPS, H |
| | | | | |
| | | | | |

FIG. 7

INFRASTRUCTURE TO SUPPORT REAL-TIME REVIEW OF EVENTS

RELATED APPLICATIONS

This application is a continuation of, and claims benefit of and priority to U.S. patent application Ser. No. 17/874,915 filed on Jul. 27, 2022, the contents of which are incorporated herein by reference in their entirety for all purposes.

BACKGROUND

Autonomous vehicles are motor vehicles capable of performing one or more necessary driving functions without a human driver's input, generally including Level 2 or higher capabilities as generally described in SAE International's J3016 Standard and including, in certain embodiments, self-driving trucks that include sensors, devices, and systems that may function together to generate sensor data indicative of various parameter values related to the position, speed, operating characteristics of the vehicle, and a state of the vehicle, including data generated in response to various objects, situations, and environments encountered by the autonomous vehicle during the operation thereof.

Vast amounts of sensor and other vehicle data to understand the road, the state of the vehicle, and the state of the environment around the vehicle may be generated and stored on-board an autonomous vehicle during on-road operation (i.e., one or more driving sessions, trips, etc.) of the vehicle. Typically, engineers and other interested entities would have to wait for the vehicle to complete its operational run(s) and return to a facility where the stored data could be uploaded off the vehicle for further inspection, processing, and analysis.

In some instances, there might be a desire or need to, for example, observe or evaluate the performance of an autonomous vehicle during an operational run of the vehicle.

As such, there exists a need for an efficient and robust system and method to support real-time review of events associated with the operation of an autonomous vehicle in a variety of different scenarios.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 7 is an illustrative depiction of a data table, in accordance with an example embodiment.

Figure 1:
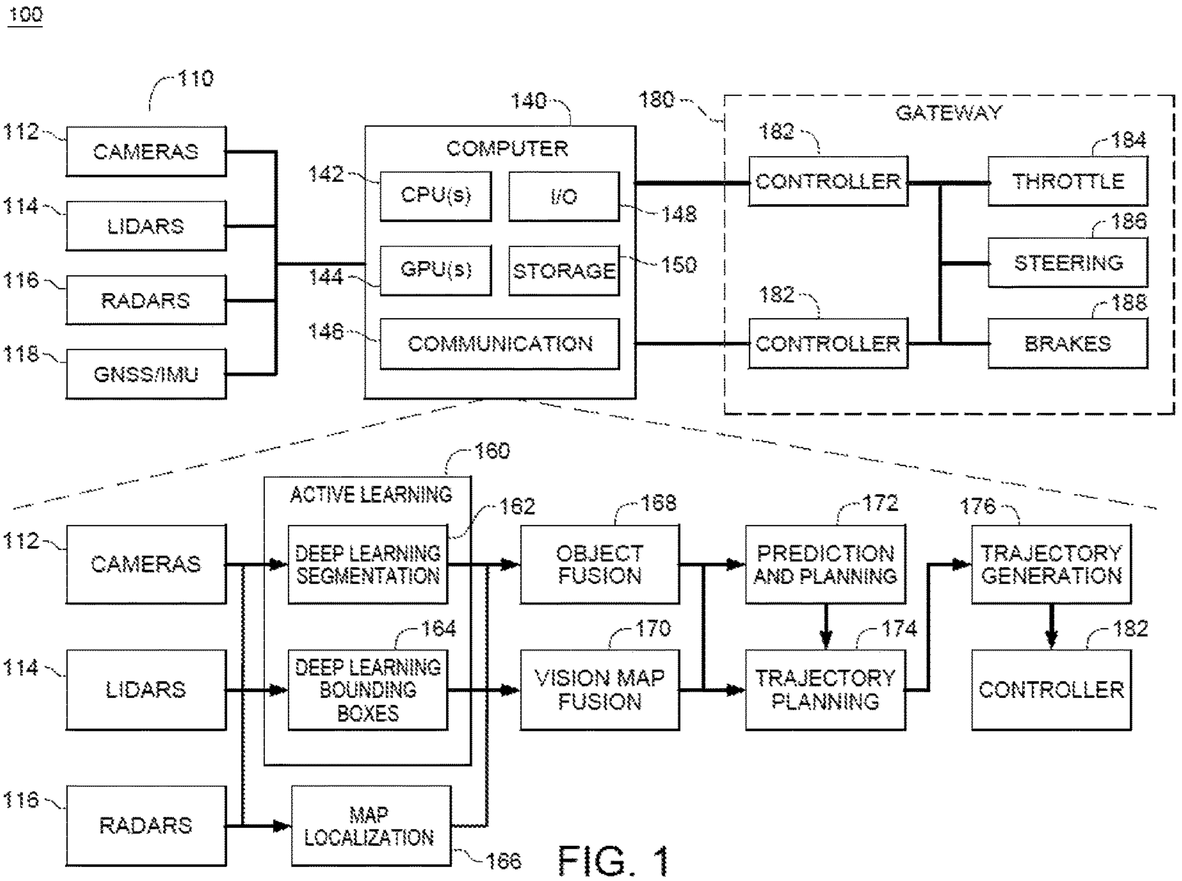
FIG. 1 is an illustrative block diagram of a control system that may be deployed in a vehicle, in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

For convenience and ease of exposition, a number of terms will be used herein. For example, the term "semi-truck" will be used to refer to a vehicle in which systems of the example embodiments may be used. The terms "semi-truck", "truck", "tractor", "vehicle" and "semi" may be used interchangeably herein. Further, as will become apparent to those skilled in the art upon reading the present disclosure, embodiments of the present invention may be used in conjunction with other types of vehicles. In general, embodiments may be used with desirable results in conjunction with any vehicle towing a trailer or carrying cargo over long distances.

Figure 2A:
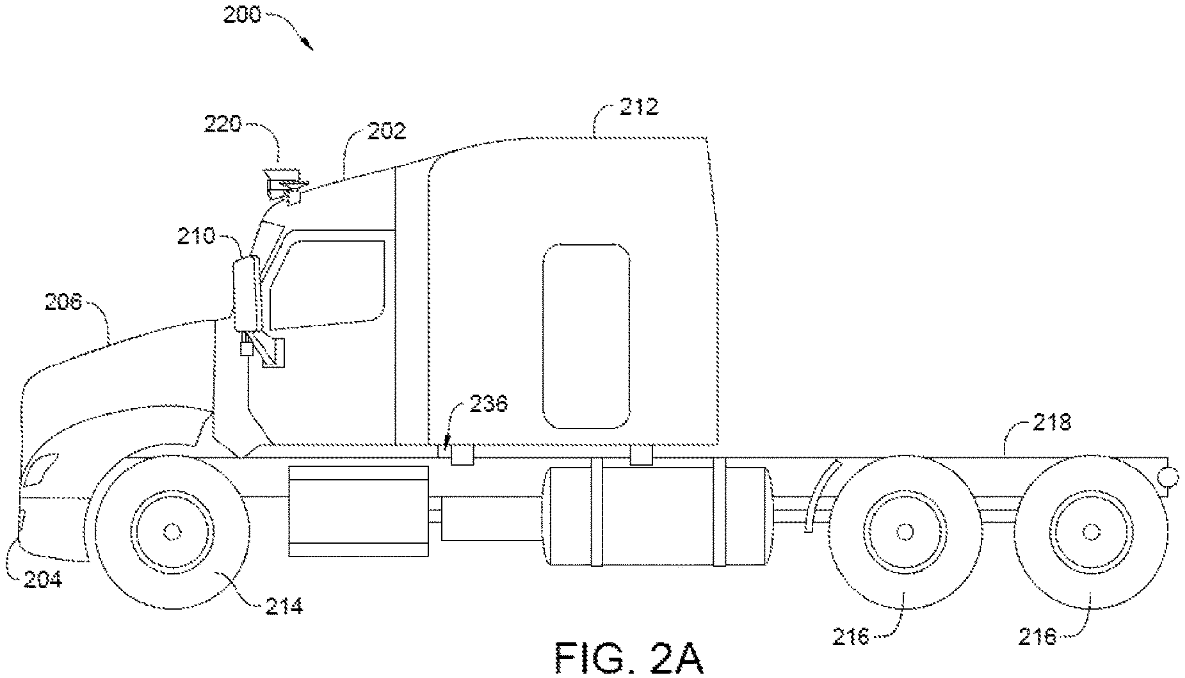
FIGS. 2A-2C are illustrative depictions of exterior views of a semi-truck, in accordance with example embodiments.
Figure 2B:
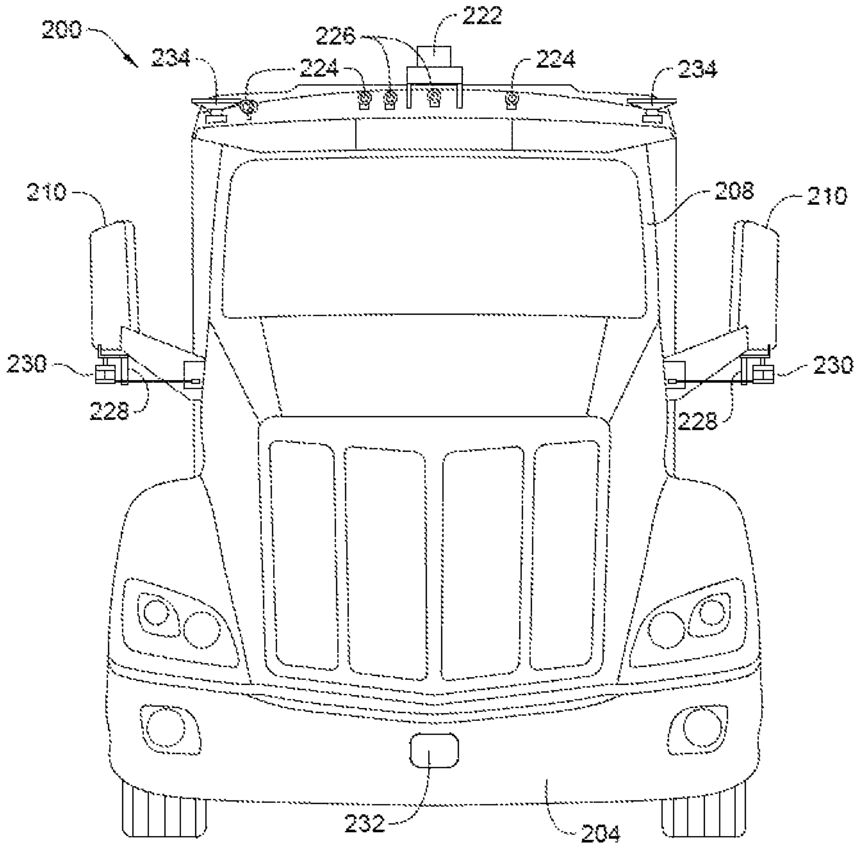
Figure 2C:
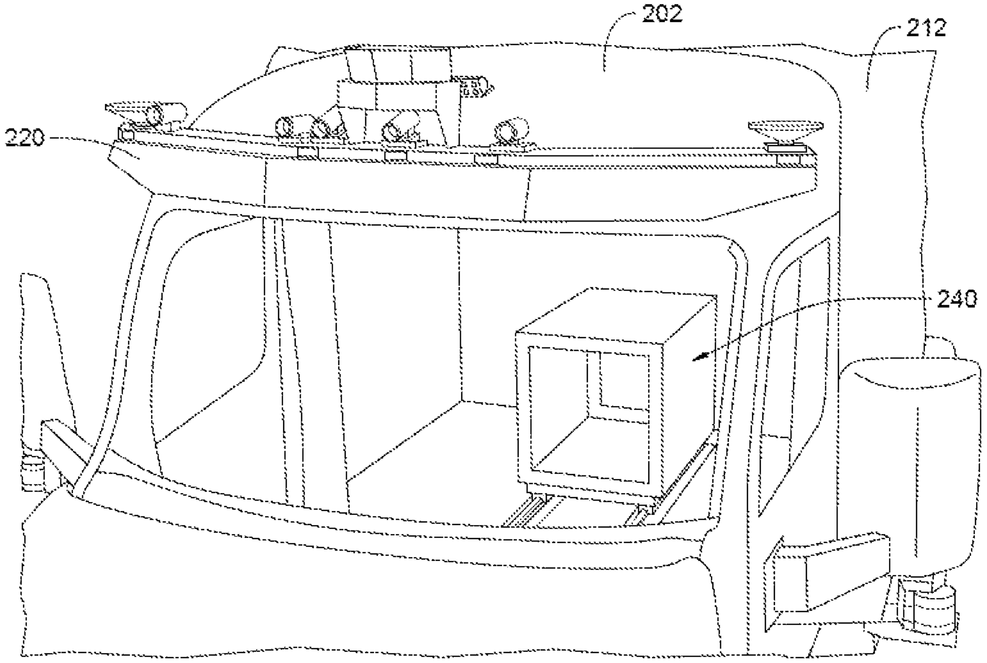

FIG. 1 illustrates a control system 100 that may be deployed in and comprise an autonomous vehicle (AV) such as, for example though not limited to, a semi-truck 200 depicted in FIGS. 2A-2C, in accordance with an example embodiment. Referring to FIG. 1, the control system 100 may include sensors 110 that collect data and information provided to a computer system 140 to perform operations including, for example, control operations that control components of the vehicle via a gateway 180. Pursuant to some embodiments, gateway 180 is configured to allow the computer system 140 to control different components from different manufacturers.

Computer system 140 may be configured with one or more central processing units (CPUs) 142 to perform processing, including processing to implement features of embodiments of the present invention as described elsewhere herein, as well as to receive sensor data from sensors 110 for use in generating control signals to control one or more actuators or other controllers associated with systems of the vehicle in which control system 100 is deployed (e.g., actuators or controllers allowing control of a throttle 184, steering systems 186, brakes 188 and/or other devices and systems). In general, control system 100 may be configured to operate the vehicle (e.g., semi-truck 200) in an autonomous (or semi-autonomous) mode of operation.

For example, control system 100 may be operated to capture images from one or more cameras 112 mounted at various locations of semi-truck 200 and perform processing (e.g., image processing) on those captured images to identify objects proximate to or in a path of the semi-truck 200. In some aspects, one or more lidars 114 and radar 116 sensors may be positioned on the vehicle to sense or detect the presence and volume of objects proximate to or in the path of the semi-truck 200. Other sensors may also be positioned or mounted at various locations of the semi-truck 200 to capture other information such as position data. For example, the sensors might include one or more satellite positioning sensors and/or inertial navigation systems such as GNSS/IMU 118. A Global Navigation Satellite System (GNSS) is a space-based system of satellites that provides the location information (longitude, latitude, altitude) and time information in all weather conditions, anywhere on or near the Earth to devices called GNSS receivers. GPS is the world's most used GNSS system and may be used interchangeably with GNSS herein. An inertial measurement unit ("IMU") is an inertial navigation system. In general, an inertial navigation system ("INS") measures and integrates orientation, position, velocities, and accelerations of a moving object. An INS integrates the measured data, where a GNSS is used as a correction to the integration error of the INS orientation calculation. Any number of different types of GNSS/IMU 118 sensors may be used in conjunction with features of the present invention.

The data collected by each of the sensors 110 may be processed by computer system 140 to generate control signals that might be used to control an operation of the semi-truck 200. For example, images and location information may be processed to identify or detect objects around or in the path of the semi-truck 200 and control signals may be transmitted to adjust throttle 184, steering 186, and/or brakes 188 via controller(s) 182, as needed to safely operate the semi-truck 200 in an autonomous or semi-autonomous manner. Note that while illustrative example sensors, actuators, and other vehicle systems and devices are shown in FIG. 1, those skilled in the art, upon reading the present disclosure, will appreciate that other sensors, actuators, and systems may also be included in system 100 consistent with the present disclosure. For example, in some embodiments, actuators that provide a mechanism to allow control of a transmission of a vehicle (e.g., semi-truck 200) may also be provided.

Control system 100 may include a computer system 140 (e.g., a computer server) that is configured to provide a computing environment in which one or more software, firmware, and control applications (e.g., items 160-182) may be executed to perform at least some of the processing described herein. In some embodiments, computer system 140 includes components that are deployed on a vehicle (e.g., deployed in a systems rack 240 positioned within a sleeper compartment 212 of the semi-truck as shown in FIG. 2C). Computer system 140 may be in communication with other computer systems (not shown) that might be local to and/or remote from the semi-truck 200 (e.g., computer system 140 might communicate with one or more remote terrestrial or cloud-based computer system via a wireless communication network connection).

According to various embodiments described herein, computer system 140 may be implemented as a server. In some embodiments, computer system 140 may be configured using any of a number of computing systems, environments, and/or configurations such as, but not limited to, personal computer systems, cloud platforms, server computer systems, thin clients, thick clients, hand-held or laptop devices, tablets, smart phones, databases, multiprocessor systems, microprocessor-based systems, set top boxes, programmable consumer electronics, network PCs, minicomputer systems, mainframe computer systems, distributed cloud computing environments, and the like, which may include any of the above systems or devices, and the like.

Different software applications or components might be executed by computer system 140 and control system 100. For example, as shown at active learning component 160, applications may be provided that perform active learning machine processing to process images captured by one or more cameras 112 and information obtained by lidars 114. For example, image data may be processed using deep learning segmentation models 162 to identify objects of interest in the captured images (e.g., other vehicles, construction signs, etc.). In some aspects herein, deep learning segmentation may be used to identify lane points within the lidar scan. As an example, the system may use an intensity-based voxel filter to identify lane points within the lidar scan. Lidar data may be processed by machine learning applications 164 to draw or identify bounding boxes on image data to identify objects of interest located by the lidar sensors.

Information output from the machine learning applications may be provided as inputs to object fusion 168 and vision map fusion 170 software components that may perform processing to predict the actions of other road users and to fuse local vehicle poses with global map geometry in real-time, enabling on-the-fly map corrections. The outputs from the machine learning applications may be supplemented with information from radars 116 and map localization 166 application data (as well as with positioning data). In some aspects, these applications allow control system 100 to be less map reliant and more capable of handling a constantly changing road environment. Further, by correcting any map errors on-the-fly, control system 100 may facilitate safer, more scalable and more efficient operations as compared to alternative map-centric approaches.

Information is provided to prediction and planning application 172 that provides input to trajectory planning 174 components allowing a trajectory to be generated by trajectory generation system 176 in real time based on interactions and predicted interactions between the semi-truck 200 and other relevant vehicles in the trucks operating environment. In some embodiments, for example, control system 100 generates a sixty second planning horizon, analyzing relevant actors and available trajectories. The plan that best fits multiple criteria (including safety, comfort and route preferences) may be selected and any relevant control inputs needed to implement the plan are provided to controller(s) 182 to control the movement of the semi-truck 200.

In some embodiments, these disclosed applications or components (as well as other components or flows described herein) may be implemented in hardware, in a computer program executed by a processor, in firmware, or in a combination of the above, unless otherwise specified. In some instances, a computer program may be embodied on a computer readable medium, such as a storage medium or storage device. For example, a computer program, code, or instructions may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of non-transitory storage medium known in the art.

A non-transitory storage medium may be coupled to a processor such that the processor may read information from, and write information to, the storage medium. In an alternative, the storage medium may be integral to the processor. The processor and the storage medium may reside in an application specific integrated circuit ("ASIC"). In an alternative embodiment, the processor and the storage medium may reside as discrete components. For example, FIG. 1 illustrates an example computer system 140 that may represent or be integrated in any of the components disclosed hereinbelow, etc. As such, FIG. 1 is not intended to suggest any limitation as to the scope of use or functionality of embodiments of a system and method disclosed herein. Computer system 140 is capable of being implemented and/or performing any of the functionality disclosed herein.

Computer system 140 may be described in the general context of computer system-executable instructions, such as program modules, being executed by a computer system. Generally, program modules may include routines, programs, objects, components, logic, data structures, and so on that perform particular tasks or implement particular abstract data types. Computer system 140 may be implemented in distributed cloud computing environments where tasks are performed by remote processing devices that are linked through a communications network. In a distributed cloud computing environment, program modules may be located in both local and remote computer system storage media including non-transitory memory storage devices.

Referring to FIG. 1, computer system 140 is shown in the form of a general-purpose computing device. The components of the computer system 140 may include, but are not limited to, one or more processors (e.g., CPUs 142 and GPUs 144), a communication interface 146, one or more input/output interfaces 148, and one or more storage devices 150. Although not shown, computer system 140 may also include a system bus that couples various system components, including system memory, to CPUs 142. In some embodiments, input/output (I/O) interfaces 148 may also include a network interface. For example, in some embodiments, some or all of the components of the control system 100 may be in communication via a controller area network ("CAN") bus or the like interconnecting the various components inside of the vehicle in which control system 100 is deployed and associated with.

In some embodiments, storage device 150 may include a variety of types and forms of non-transitory computer readable media. Such media may be any available media that is accessible by computer system/server, and it may include both volatile and non-volatile media, removable and non-removable media. System memory, in one embodiment, implements the processes represented by the flow diagram (s) of the other figures herein. The system memory can include computer system readable media in the form of volatile memory, such as random access memory (RAM) and/or cache memory. As another example, storage device 150 can read and write to a non-removable, non-volatile magnetic media (not shown and typically called a "hard drive"). Although not shown, the storage device 150 may include one or more removable non-volatile disk drives such as magnetic, tape or optical disk drives. In such instances, each can be connected to the bus by one or more data media interfaces. Storage device 150 may include at least one program product having a set (e.g., at least one) of program modules, code, and/or instructions that are configured to carry out the functions of various embodiments of the application.

FIGS. 2A-2C are illustrative depictions of exterior views of a semi-truck 200 that may be associated with or used in accordance with example embodiments. Semi-truck 200 is shown for illustrative purposes only. As such, those skilled in the art, upon reading the present disclosure, will appreciate that embodiments may be used in conjunction with a number of different types of vehicles and are not limited to a vehicle of the type illustrated in FIGS. 2A-2C. The example semi-truck 200 shown in FIGS. 2A-2C is one style of truck configuration that is common in North American that includes an engine 206 forward of a cab 202, a steering axle 214, and two drive axles 216. A trailer (not shown) may typically be attached to semi-truck 200 via a fifth-wheel trailer coupling that is provided on a frame 218 and positioned over drive axles 216. A sleeper compartment 212 may be positioned behind cab 202, as shown in 2A and 2C. FIGS. 2A-2C further illustrate a number of sensors that are positioned at different locations of semi-truck 200. For example, one or more sensors may be mounted on a roof of cab 202 on a sensor rack 220. Sensors may also be mounted on side mirrors 210, as well as other locations of the semi-truck. Sensors may be mounted on a bumper 204, as well as on the side of the cab 202 and other locations. For example, a rear facing radar 236 is shown as being mounted on a side of the cab 202 in FIG. 2A. Embodiments may be used with other configurations of trucks and other vehicles (e.g., such as semi-trucks having a cab over or cab forward configuration or the like). In general, and without limiting embodiments of the present disclosure, features of the present invention may be used with desirable results in vehicles that carry cargo over long distances, such as long-haul semi-truck routes.

FIG. 2B is a front view of the semi-truck 200 and illustrates a number of sensors and sensor locations. The sensor rack 220 may secure and position several sensors above windshield 208 including a long range lidar 222, long range cameras 224, GPS antennas 234, and mid-range front facing cameras 226. Side mirrors 210 may provide mounting locations for rear-facing cameras 228 and mid-range lidar 230. A front radar 232 may be mounted on bumper 204. Other sensors (including those shown and some not shown) may be mounted or installed on other locations of semi-truck 200. As such, the locations and mounts depicted in FIGS. 2A-2C are for illustrative purposes only.

Referring now to FIG. 2C, a partial view of semi-truck 200 is shown that depicts some aspects of an interior of cab 202 and the sleeper compartment 212. In some embodiments, portion(s) of control system 100 of FIG. 1 might be deployed in a systems rack 240 in the sleeper compartment 212, allowing easy access to components of the control system 100 for maintenance and operation.

Particular aspects of the present disclosure relate to a method and system providing a framework or architecture for specifying triggers that indicate whether an incident of interest has occurred and further automatically provide, in real-time as an autonomous vehicle, AV, (e.g., a truck similar to that disclosed in FIGS. 1 and 2A-2C) is being operated (e.g., driven), a mechanism to capture and reliably upload a specific set of data for immediate access to the specific set of data. The disclosed framework may be used to provide insights into the status of the AV and its surrounding environment as the AV is being operated, as well as quicker (i.e., real-time) access to some set of data captured by the AV. Aspects of the present disclosure provide, in general, a framework to access specific sets of data corresponding to predefined events as the specific data is being sensed, generated, or collected at the AV during an operation of the AV.

Figure 3:
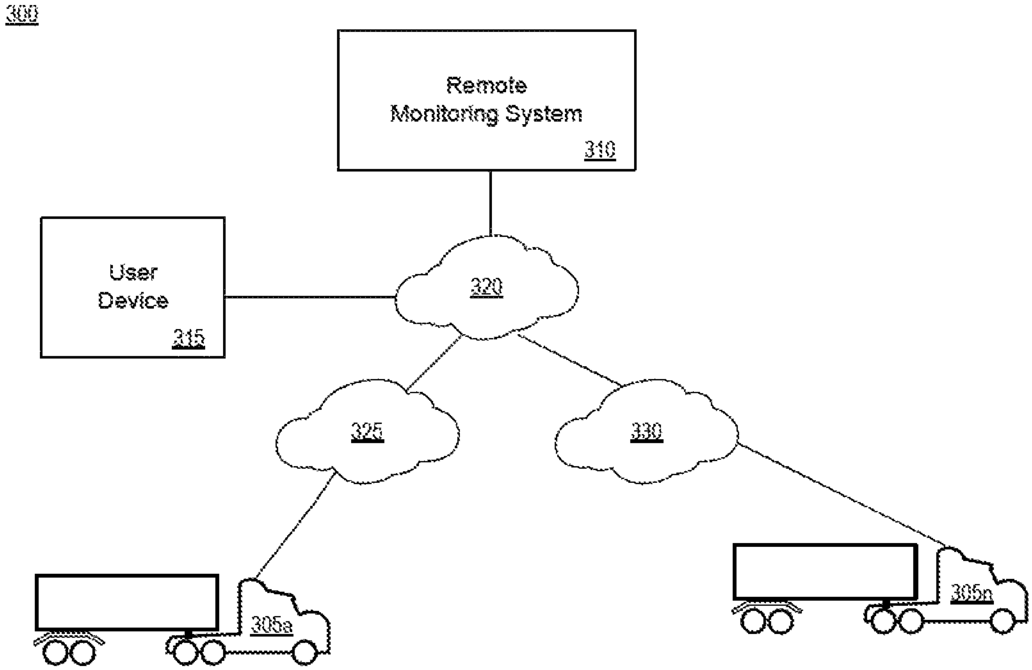
FIG. 3 is an illustrative depiction of a communication environment in which an autonomous vehicle may operate, in accordance with an example embodiment.

FIG. 3 is an illustrative depiction of an environment in which an autonomous vehicle may operate, in accordance with an example embodiment. As shown in FIG. 3, a system 300 may include one or more AVs (e.g., semi-trucks) 305*a-n* that are in communication with a remote monitoring system

310 via networks 320, 325, and 330. In the example of FIG. 3, AV 305*a* communicates with remote monitoring system 310 via network 325 (e.g., a first cellular network or cell) and network 320, whereas AV 305*n* communicates with remote monitoring system 310 via network 330 (e.g., a second cellular network or cell) and network 320. In some instances, network 320 may comprise one or more different networks (not shown), where those different communication networks are collectively represented by network 320 since the number or types of the network(s) might change, for example, as AVs s 305*a-n* traverse different roadways. One or more user devices 315 may also be in communication with the remote monitoring system 310 and, in some embodiments, with one or more AVs 305*a-n* via network 320.

To introduce features of some embodiments, an illustrative example will now be provided with reference to FIG. 3. In an illustrative example, a number of AVs 305*a-n* are in operation, traversing different areas of the country. Each AV 305 is in communication with remote monitoring system 310 via different networks. For example, AV 305*s* may be on a remote section of interstate highway in a rural area and may be in communication with a network 325. Network 325 may be a cellular network with poor coverage (e.g., messages transmitted over network 325 may be received unreliably and with varying degrees of latency). AV 305*a* may be on a less remote section of an interstate highway and may be in communication with a cellular network 330 (or portion thereof) having reliable (i.e., excellent) coverage. In one example scenario, both AVs 305 are being operated in a semi-autonomous fashion (e.g., a driver is present in the vehicle but the vehicle is currently being controlled by a self-driving system). Some embodiments of the present disclosure provide a mechanism for AVs 305 to reliably and efficiently communicate with remote monitoring system 310 to transmit, during an operation of the AVs, a specific, predefined set of sensor and other data associated with each AV to the remote monitoring system 310 in response to the occurrence of specific events, even in an instance some of the transmissions may be dropped or subject to communication network delays.

In some instances, an AV might record all of the sensor and other system data generated by its embedded sensors (e.g. cameras, lidars, radars, etc.), control systems (e.g., steering, braking, etc.), and processing systems (e.g., planning software, prediction software, perception software, etc) on an on-board memory device (e.g., FIG. 1, semi-truck storage 150), where the quantity of all of this data is typically very large (e.g., 150 MBps) and is stored on the AV until it completes its operations. After the AV has completed operations (i.e., one or more driving runs), the sensor and other data stored on-board the AV may be uploaded off of the AV for inspection, analysis, and further processing. In some aspects, embodiments disclosed herein are able to reliably transmit data associated with operation of the AV to a remote monitoring system as the data is being captured (i.e., during the operation of the AV) by transmitting a specific set of data to the remote monitoring system. In some aspects, the specific set of data transmitted to the remote monitoring system is a particular, defined subset of the data generated or otherwise stored by the AV. In some embodiments, the transmittal of the specific set of data associated with operation of the AV might be initiated in response to the occurrence of one or more triggers. As used herein, these one or more triggers are referred to as events, where the occurrence of an "event" may be the basis for initiating, during operation of the AV, a retrieval of a specific set of data associated with the operation of the AV and the transmittal of such data to a remote monitoring system. In some embodiments, the one or more events may be selectively defined to include or consider one or more vehicle signal data, diagnostic data, environmental characteristics, and operating data, rules, requests, and combinations thereof. In some embodiments, a mechanism is provided to support the specification of a specific subset of the stored AV data that is associated with predefined event. In one illustrative example, a configuration file may be provided that includes a specification defining the specific subset of the stored AV data to associate each potential event processed by the disclosed system. In this manner, some embodiments disclosed herein relate to a system and method that provides a highly flexible and extendable framework that may encompass a wide variety of different events and various specifications of subsets of AV associated data corresponding to those different events, where the occurrence of a particular predefined event automatically causes a specific subset of AV associated data stored by the AV to be reliably transmitted to a remote monitoring system during the operation of the AV (i.e., in real-time as or nearly as the data is captured).

Illustrative examples will now be presented to demonstrate, in some aspects, the flexibility and diversity of some of the events related to the present disclosure. As an example, consider a scenario where an AV vehicle is driving down a road operating in autonomous mode (i.e., controlled by a self-driving mode of operation) and an intervention occurs. As used herein, an intervention occurs when a safety driver in the vehicle takes control of the vehicle operating in autonomous mode. For this type of event, data around (e.g., 10 seconds before and 10 seconds after) the occurrence of the event (i.e., the intervention) is considered immediately useful or relevant for review by, for example, engineers, operations support techs, safety team, etc. Accordingly, an event representing an "intervention" may be defined for a system herein, where the occurrence of an "intervention" invokes the retrieval of certain types of AV associated data (e.g., specified sensor data, various system states, etc.) 10 seconds before and 10 seconds after the occurrence of the "event". In this example, a 20-second chunk of AV associated data including a predefined set of information may be uploaded to the cloud (e.g., to remote monitoring system 310 via networks 325 and 320 in FIG. 1). In this manner a select subset of the data stored by the AV might be uploaded, as opposed to all of the data generated in the 20-second time interval surrounding the occurrence of the intervention.

As another example, consider a scenario where a vehicle is driving down a road (i.e., operating) in autonomous mode and during this operation of the AV some software, hardware, or combination thereof is monitoring the state of the world around the vehicle and detects a predefined condition is satisfied (e.g., a situation where there are more than 6 vehicles around the vehicle and confidence levels associated with these tracked objects are each less than 50%). The occurrence of this particular event (i.e., the predefined condition, rule, or set of conditions/rules are satisfied) may then trigger the retrieval of a particular predefined subset of data from the AV including certain types of AV associated data (e.g., specified sensor data, various system states, etc.) 30 seconds before and 15 seconds after the occurrence of this event, where the specified subset of data is uploaded to the cloud for immediate access and review.

Another illustrative example may be demonstrated by a scenario wherein a vehicle is driving down a road and an authorized entity (e.g., a support technician, engineer, etc.) is remotely monitoring the vehicle via, for example, some low-bandwidth stream(s) and realizes they now want to inspect a particular time period of data in more detail than that afforded by the low bandwidth data stream(s). In this scenario, the authorized entity might request a particular subset of data to be uploaded by the vehicle immediately (e.g., the request might specify terms for the subset of data in terms of one or both of time and types of data) and transmitted to them via the cloud.

As seen in the foregoing examples, the present disclosure relates to systems and methods that provide and support a diverse variety of different predefined events and various specifications of subsets of AV associated data specified to correspond or correlate to those different predefined events, where the occurrence of a particular predefined event (e.g., whether based on signal(s) from the AV or a manual request) automatically causes a specified subset of AV associated data stored by the AV to be reliably transmitted to a remote monitoring systems during the operation of the AV. As a further example of the extensibility of the present disclosure, some embodiments of the systems and methods disclosed herein may be used for regulatory and policy compliance. For example, an "event" herein may be defined to include the occurrence of an incident or scenario related to a regulatory agency (e.g., National Highway Traffic Safety Administration NHTSA) requirement or an organization's internal policy, where the defined event can be used as a basis to collect a set of data in compliance with the regulatory and policy.

Figure 4:
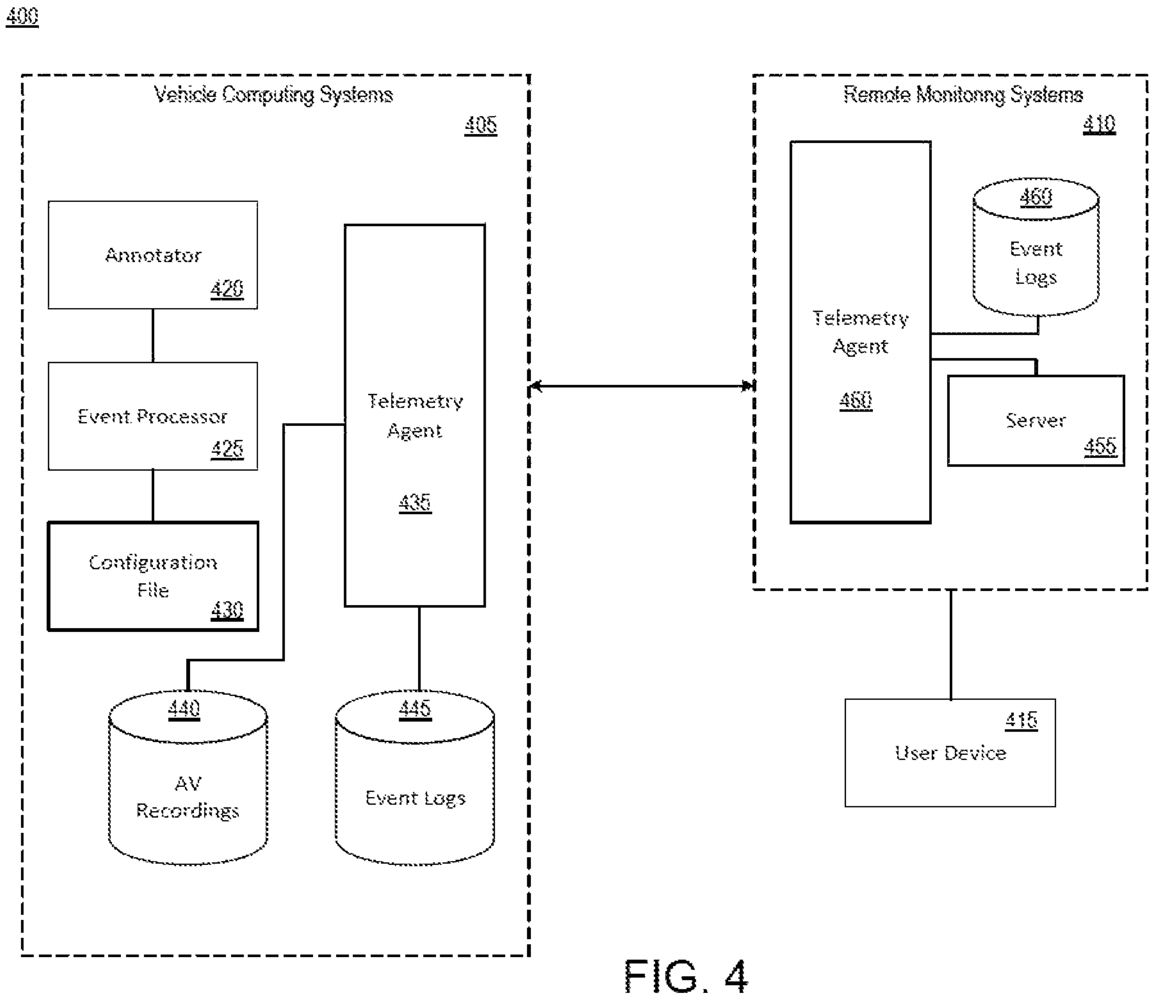
FIG. 4 is an illustrative block diagram illustrating aspects of a system, in accordance with an example embodiment.

Reference is now made to FIG. 4 where an illustrative system block diagram 400 that depicts a vehicle computing system 405 associated with an AV (e.g., FIG. 3, AV 305), a remote monitoring system 410, and a user device 415. The vehicle computing system 405 may act in conjunction with other vehicle sensors and systems, for example such as those shown in the semi-truck 200 disclosed in FIGS. 2A-2C, as well as the control system 100 of FIG. 1. That is, in one practical application, the vehicle computing system 405 shown in FIG. 4 may be deployed on a vehicle in conjunction with other vehicle sensors and systems.

In general, vehicle computing system 405 may include a number of other components such as, for example, sensors and the like (including those shown and described herein in conjunction with FIG. 1). For the purposes of describing components relating to an infrastructure (e.g., framework) to support the real-time review of events pursuant to the present disclosure, only selected components are represented in FIG. 4. Pursuant to some embodiments, vehicle computing system 405 includes components or modules (e.g., software, hardware, and combinations thereof) configured and capable to perform processing including annotator 420, event processor 425, configuration file 430, telemetry agent 435, AV recordings data storage 440, and event logs storage 445.

In some embodiments, telemetry agent 435 is configured to receive inputs including indications of potential events. Since an event may encompass a variety of different incidents as discussed hereinabove, telemetry agent 435 may receive inputs from a variety of sources, including but not limited to, for example, AV signal data (e.g., sensor signals, control system signals, etc.), vehicle diagnostic data, tracked object data, environmental characteristics and operating data, system generated requests, etc. and forward them to event processor 425. In addition to monitoring the AV on which it is deployed for these automatically generated signals and data, telemetry agent 435 may receive or monitor for a manual request for a subset of specified data. Event processor 425 may be configured, based on a specification (e.g., custom logic) that defines, for example, which sensor signals, control system signals, and other software level signals and requests to monitor and analyze to determine whether an event, as defined by the specification, constitutes the occurrence of an event. The specification used by the event processor to determine whether an event has occurred may base its analysis on one or more different rules, conditions, thresholds, limits, boundary conditions, relationships, algorithms, etc. In some aspects, the specification (e.g., custom logic) implemented by the annotator may be written as code deployed on the vehicle. The annotator may generate an output including an indication of an occurrence of a predefined event associated with the operation of the vehicle. The output from annotator 405 may be provided as an input to event processor 425.

Event processor 425 may operate to receive the indication of the occurrence of the predefined event to determine at least one action to be performed. Event processor 425 may reference configuration file 430 in determining what action is to be performed in response to the particular event emitted by the annotator. In general, the at least one action may include a retrieval of a specified subset of the stored AV data associated with the operation of the vehicle from a memory, such as AV recording data storage 440. The at least one action might include a retrieval of a specified subset of the stored AV recordings data associated with the operation of the vehicle. In some aspects, configuration file 430 may be written as configurable code deployed on the vehicle.

In some instances, the specification (e.g., custom logic) implemented by the annotator and the configuration file (or other data structure) used by the event processor might be deployed separately to the AV. In this manner, these distinct deployments may be managed separately, including the lifecycles of each deployment. For example, the specification for the annotator might be deployed as part of the self-driving code installed on the AV, whereas the configuration file 430 may be deployed separately therefrom and updates to the configuration file might not require a change to the AV's self-driving stack.

Referring to FIG. 4, event processor 425 may further operate to issue, in response to determining the subset of the stored AV recordings data associated with the indicated event, a request to telemetry agent 435 to upload the determined, specific subset of the stored AV recordings data. In response to receiving the request to retrieve the specified subset of data, telemetry agent 435 may extract, read, or otherwise retrieve the requested subset of data from AV recording data storage 440. The Telemetry agent may collect all of the requested data (e.g., different types of sensor data, vehicle diagnostic data, and GPS data for a specific interval of time, etc.) and package it as a log file (or other data structure). Telemetry agent 435 may also operate to transmit the subset of data retrieved from the AV recordings data storage, including processing related to formatting, compressing, and otherwise configuring the data package for reliable transmission to remote monitoring system 410. A record of the event log files generated by telemetry agent 405 may be stored, at least temporarily, in event logs data storage 445. In this manner, the event log files may be managed separately and independent of the AV recordings data storage 440.

Remote monitoring system 410, including telemetry agent 450, server 455, and event logs data storage 460 may receive the data package including the specified subset of data transmitted from the vehicle computing system 405. In one embodiment, telemetry agent 450 is configured to receive the data package transmitted from the vehicle computing system 405. A record of the received data packages may be stored on event logs data storage 460 for various purposes, including for example, inspection of the state and operation of the AV at or around the time of occurrence for the detected events, the reconstruction of the detected event, the construction of a simulation of the vehicle operation, etc. In some aspects, server 455 may facilitate and support communication between the remote monitoring system 410 and user device 415. For example, in one embodiments, a user might manually request a specific data package from the vehicle computing system in accordance with other aspects of the present disclosure, where the request is received and processed by server 455 and further sent to vehicle computing system 405 via telemetry agent 450.

Figure 5:
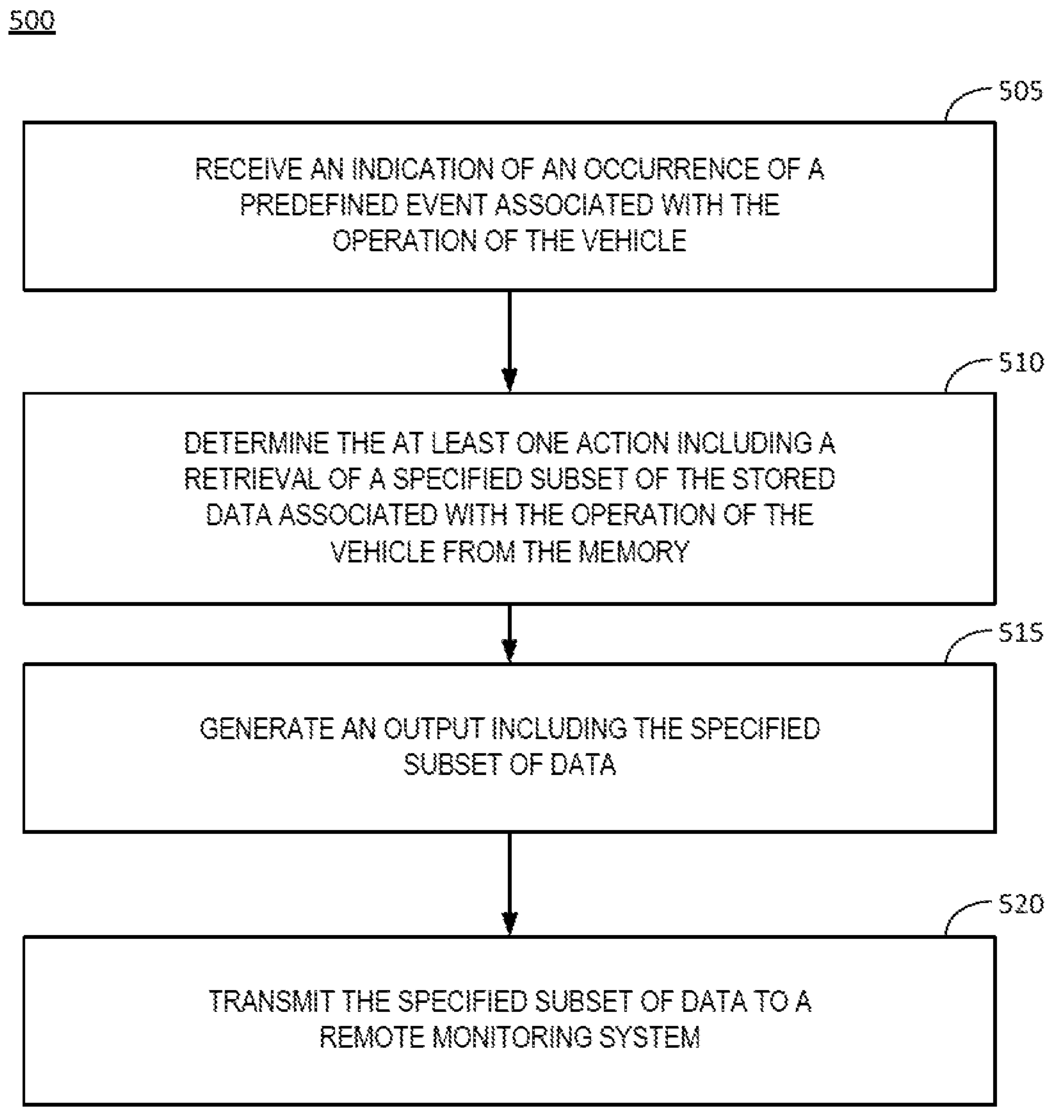
FIG. 5 is an illustrative flow diagram of a process, in accordance with an example embodiment.

FIG. 5 is an illustrative flow diagram of a process, in accordance with an example embodiment. In some embodiments, a framework or architecture disclosed herein might be used to implement some aspects of process 500. At operation 505, an indication of an occurrence of a predefined event associated with the operation of the vehicle is received. In accordance with some aspects of the present disclosure, the indication of the occurrence of a predefined event might be (i) based on one or more signals and data received from sensors and systems of the AV and (ii) received from at least one of a user device and a remote monitoring system. In some aspects, the predefined event might be a direct request for the specified subset of the stored AV data associated with the operation of the vehicle.

At operation 510, at least one action to be performed by a vehicle computing system herein (e.g., FIG. 4, 405) is determined, where this determination is executed in response to the reception of the indicated occurrence of the predefined event. Moreover, the at least one action may include the retrieval of a specified subset of the stored AV recordings data associated with the operation of the vehicle. In some instances, the specified subset of the stored AV associated data is defined by one or more of a data type, a start timestamp, a stop timestamp, a data sequence duration, combinations thereof, and possibly other types of data. In some aspects, the determination of the at least one action may be based on a configuration file or some other data structure representation of a specification defining the specified subset of the stored AV data associated with the indicated occurrence of a predefined event.

Continuing with process 500 at operation 515, an output including the specified subset of data (i.e., a data package) is generated. The specified subset of data or data package may be transmitted to a remote monitoring system, as noted at operation 520. In some aspects, operation 520 (or a separate operation, not shown in FIG. 5) might include transmitting an indication of the data request for the specified subset of data to the remote vehicle monitoring system (e.g., to maintain a record of the data requests) and transmitting a status of the data request for the specified subset of data to the remote vehicle monitoring system, wherein the status is at least one of requested, generating, uploading, uploaded, and processing.

In some embodiments, process 500 may further include an operation to define the set of requirements for the one or more actions performed by an AV herein. This operation of defining the set of requirements might be performed independently of or in conjunction with one of the operations of process 500. For example, the defining of the set of requirements for the one or more actions might be accomplished prior to operations 505 or 510 or performed with or in parallel therewith.

Figure 6:
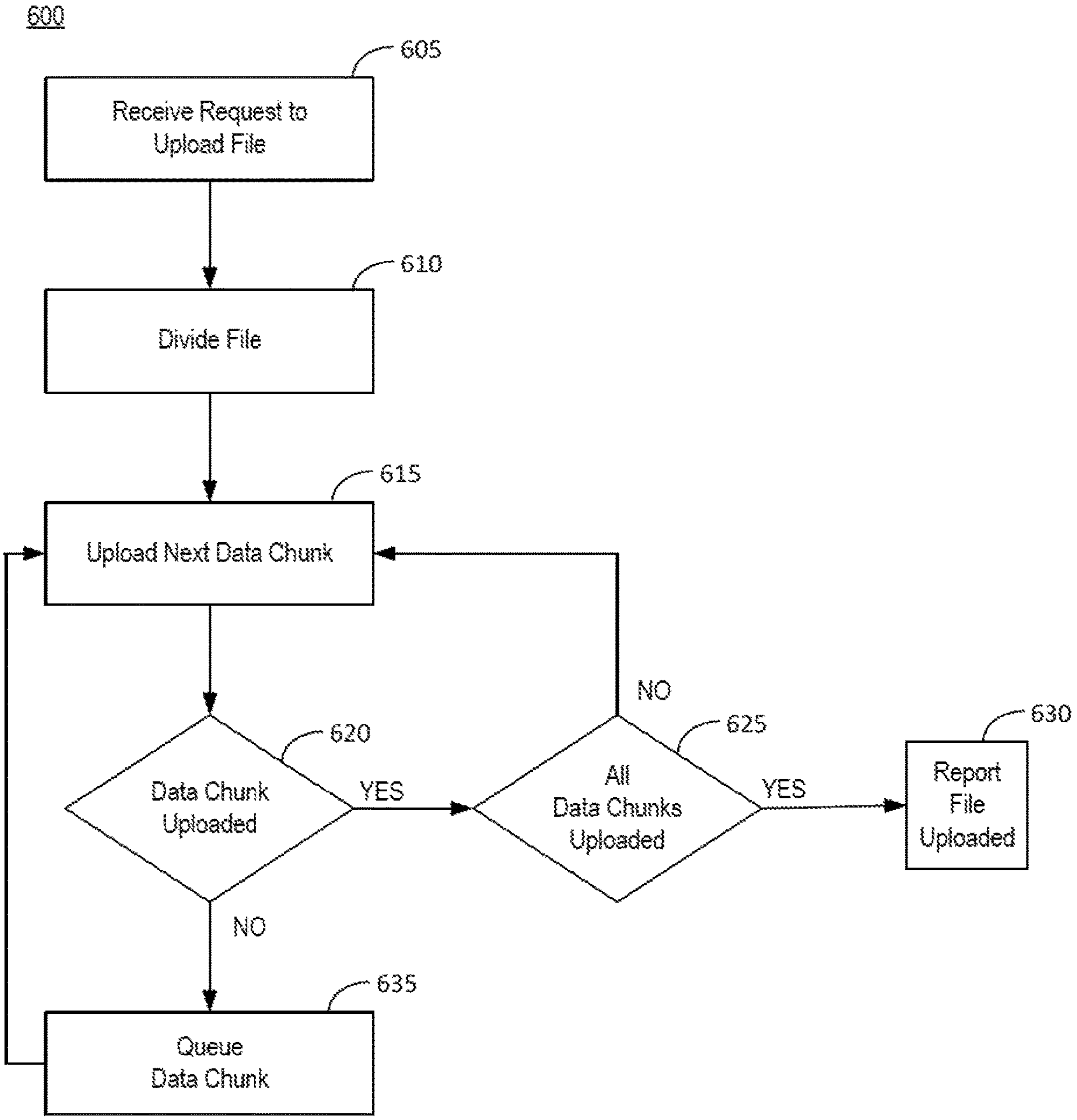
FIG. 6 is an illustrative flow diagram of another process, in accordance with an example embodiment.

Referring to FIG. 6, a framework or architecture disclosed herein might be used to implement some aspects of process 600 to ensure a reliable transmission of a data package, in accordance with an example embodiment. At operation 605, a request to upload a specific subset of the stored data associated with the operation of an AV is received. The request may be received by, for example, the telemetry agent 435 disclosed in conjunction with the vehicle computing system 405 of FIG. 4 and might include one or more different types of data, including a sequence of data recorded over a specified period of time surrounding the occurrence of a detected event and configured as a data package. At operation 610, the data package may be divided into a plurality of smaller data chunks. For example, a 200 MB file might be divided into forty chunks, where each chunk is 5 MB. In some contexts, such as operating environments having unreliable communication networks (e.g., cellular or other networks), the data chunks may be stored in a queue (e.g., a buffer) and a next data chunk of the data package may be uploaded or transmitted at operation 615. In the instance an initial chunk of a data package is being uploaded at operation 615, then the "next data chunk" is the initial chunk of the data package.

Proceeding to operation 620, a determination is made whether the data chunk from operation 615 has been uploaded. Operation 620 may be performed periodically, wherein the frequency of this determination might depend on a size of the data chunk, the type of communication network, a type of communication protocol being implemented, a user-specified value (e.g., a set time interval), a compression rate, limits of the communication network (whether fixed or variable), combinations thereof, and other considerations. If the data chunk of interest at operation 620 is determined to have been uploaded, then process 600 proceeds to operation 625 where a check is performed to determine whether all of the data chunks of the current data package have been uploaded. If all of the data chunks of the current data package have been uploaded, the process advances to operation 630 where the completion of data package (i.e., all data chunks comprising the data package) upload is reported (e.g., the completion of the upload may be reported to a remote monitoring system). In the instance all of the data chunks of the current data package have not yet been uploaded as determined at operation 625, then process 600 continues to operation 615 to consider a next data chunk in the current data package.

Returning to operation 620, in an instance the data chunk of interest is determined to have not been uploaded (e.g., due to an unreliable or lost communication channel/network), then process 600 proceeds to operation 635 where the data chunk is placed in a queue (e.g., the same queue from which the data chunk was initially pulled or a different queue in some embodiments) or otherwise retained. Upon a data chunk upload failure at operation 620, the data chunk may be re-enqueued at operation 635, wherein process 600 may wait for a specified (fixed or variable) period of time (e.g., 5 seconds, etc.) before returning to operation 615 to attempt to upload the data chunk again. The specified delay in returning to operation 615 from operation 635 may be provided to, for example, wait for a return of favorable or reliable communications. As noted previously, if all of the data chunks of the current data package have been uploaded, the completion of data package upload is reported at operation 630. If all of the data chunks of the current data package have not yet been uploaded at operation 625 during any subsequent iteration of process 600, then the process returns to operation 615 to consider a next data chunk.

Process 600 may, in some embodiments, include additional, fewer, or alternative operations, including combinations with one or more of the operations shown in FIG. 6. In particular instances, process 600 may be modified to accommodate different communication networks, protocols, and techniques, as well as various operational considerations and constraints.

FIG. 7 is an illustrative depiction of a table for attributes for a specified subset of data associated with the operation of an AV, according to some embodiments. Table 700 represents, in some aspects, minimum aspects of a table representation for data including attributes for a subset of data specified for one or more particular events, in accordance with other aspects disclosed herein. In some aspects, table 700 includes an event type 705, an event identifier 710 (i.e., event ID), a start time for data collection relative to an event occurrence at 715, a stop time for data collection relative to the event occurrence at 720, and an indication of the types of data to be collected and included in the subset of data at 725 (e.g., camera data, CAM; Lidar data, LID; GPS data, and Heading data, H) In some instances, more, fewer, and alternative types of data might be specified in table 700, where the possible data types are not limited to those explicitly depicted in the example of FIG. 7.

Figure 8:
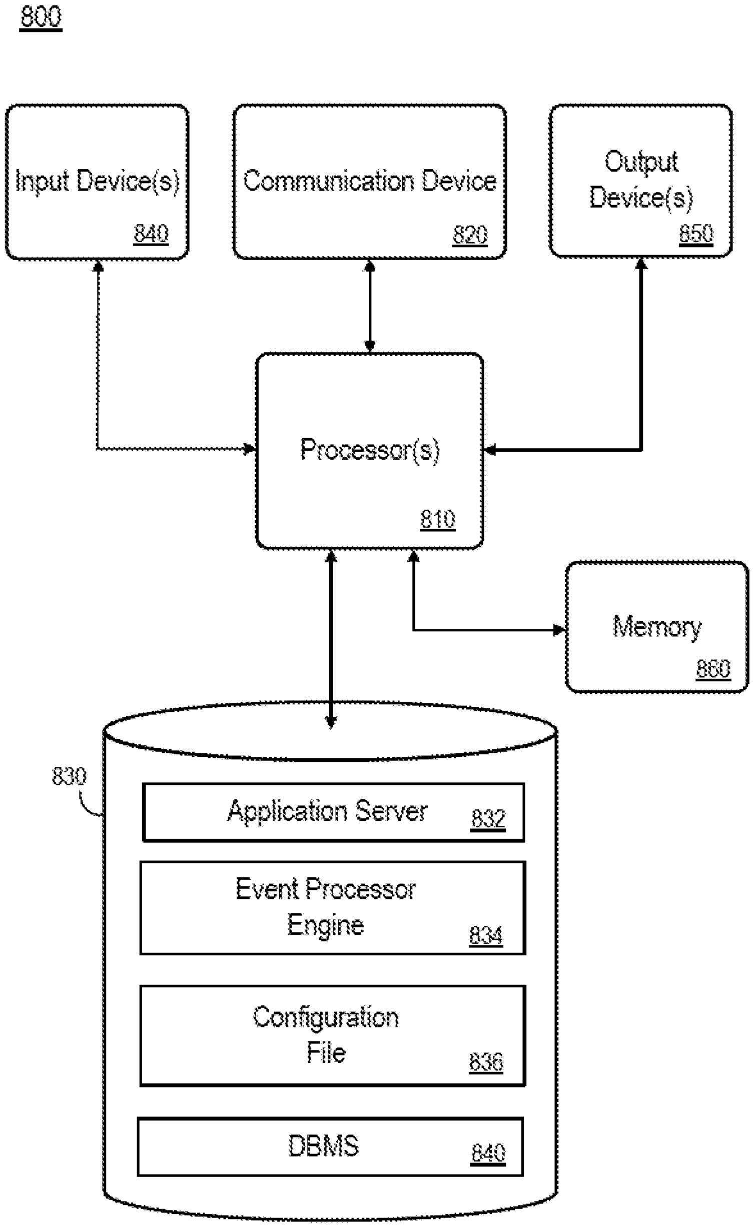
FIG. 8 an illustrative block diagram of a computing system, in accordance with an example embodiment.

FIG. 8 illustrates a computing system 800 that may be used in any of the architectures or frameworks (e.g., FIG. 1, computer 140; FIG. 4, vehicle computing system 405. 7) and processes (e.g., FIGS. 5 and 6) disclosed herein, in accordance with an example embodiment. FIG. 8 is a block diagram of server node 800 embodying an event processor, according to some embodiments. Computing system 800 may comprise a general-purpose computing apparatus and may execute program code to perform any of the functions described herein. Computing system 800 may include other unshown elements according to some embodiments.

Computing system 800 includes processing unit(s) 810 operatively coupled to communication device 820, data storage device 830, one or more input devices 840, one or more output devices 850, and memory 860. Communication device 820 may facilitate communication with external devices, such as an external network, a data storage device, or other data source. Input device(s) 840 may comprise, for example, a keyboard, a keypad, a mouse or other pointing device, a microphone, knob or a switch, an infra-red (IR) port, a docking station, and/or a touch screen. Input device (s) 840 may be used, for example, to enter information into computing system 800 (e.g., a manual request for a specific set of AV operation associated data). Output device(s) 850 may comprise, for example, a display (e.g., a display screen) a speaker, and/or a printer.

Data storage device 830 may comprise any appropriate persistent storage device, including combinations of magnetic storage devices (e.g., magnetic tape, hard disk drives and flash memory), optical storage devices, Read Only Memory (ROM) devices, etc., while memory 860 may comprise Random Access Memory (RAM).

Application server 832 may each comprise program code executed by processor(s) 810 to cause computing system 800 to perform any one or more of the processes described herein. Embodiments are not limited to execution of these processes by a single computing device. Data storage device 830 may also store data and other program code for providing additional functionality and/or which are necessary for operation of computing system 800, such as device drivers, operating system files, etc. Event processor engine 834 may include program code executed by processor(s) 810 to determine, in response to an indicated occurrence of a predefined event, at least one action including a retrieval of a specified subset of the stored data associated with the operation of an AV from a memory, as disclosed in various embodiments herein. Event processor engine 834 may refer to configuration file 836 to execute its analysis and determinations. Results generated by the event processor engine 834 may be stored in a database management system node 840.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A remote monitoring system, comprising:

a memory storing computer instructions;

a communication port, for communicating with a remote vehicle over a low-bandwidth interface;

a data storage device storing data associated with operation of the remote vehicle including data captured by at least a first sensor of the remote vehicle; and a processor communicatively coupled with the memory to execute the instructions and during operation of the remote vehicle, capable of:

receiving through the communication port, from the remote vehicle, a low-bandwidth data stream including information associated with real-time operation of the remote vehicle, the low-bandwidth data stream comprising telemetry data of a small size suitable for the low-bandwidth interface;

receiving a selection of a specific previous time period of the operation of the remote vehicle for further inspection;

transmitting, to the remote vehicle, a data request for vehicle operational data stored by the remote vehicle and associated with the specific previous time period to be uploaded by the remote vehicle to a server, the vehicle operational data generated by at least a first sensor of the remote vehicle, wherein the vehicle operational data is of a larger size than the telemetry data and unsuitable for the low-bandwidth data stream;

receiving from the server a data package comprising the vehicle operational data associated with the specific previous time period; and using the received data package, simulating operation of the remote vehicle during the specific previous time period.

2. The remote monitoring system of claim 1, wherein the data request further includes a request for one or more specific data types during the specific previous time period.

3. The remote monitoring system of claim 2, wherein the data types include at least one of: camera data, lidar data, GPS data, and heading data.

4. The remote monitoring system of claim 1, wherein the vehicle operational data includes at least one of vehicle signal data, vehicle diagnostic data, vehicle environmental characteristics, and vehicle operating data.

5. The remote monitoring system of claim 1, wherein the specific previous time period is defined by one or more of a start timestamp, a stop timestamp, a data sequence duration, and a combination thereof.

6. The remote monitoring system of claim 1, wherein the processor is further capable of receiving, from the remote vehicle, output data generated by the remote vehicle, the output data including the vehicle operational data divided into a plurality of data chunks.

7. The remote monitoring system of claim 1, wherein the processor is further capable of:

receiving, from the remote vehicle, a confirmation of the data request for the vehicle operational data; and receiving, from the remote vehicle, a status of the data request, wherein the status is at least one of requested, generating, uploading, uploaded, and processing.

8. The system of claim 1, wherein the remote vehicle is a semi-truck.

9. A method for operating a remote monitoring system to monitor a status of the operation of a remote vehicle, the method comprising:

receiving, from the remote vehicle, a low-bandwidth data stream including information associated with real-time operation of the remote vehicle, the low-bandwidth data stream comprising telemetry data of a small size suitable for the low-bandwidth interface;

receiving, from an operator console associated with the remote monitoring system, a selection of a specific previous time period of the operation of the remote vehicle for further inspection;

transmitting, to the remote vehicle, a data request for vehicle operational data stored by the remote vehicle and associated with the specific previous time period to be uploaded by the remote vehicle to a server, the vehicle operational data generated by at least a first sensor of the remote vehicle, wherein the vehicle operational data is of a larger size than the telemetry data and unsuitable for the low-bandwidth data stream;

receiving from the server a data package comprising the vehicle operational data associated with the specific previous time period; and using the received data package, simulating operation of the remote vehicle during the specific previous time period.

10. The method of claim 9, wherein the data request further includes a request for one or more specific data types during the specific previous time period.

11. The method of claim 10, wherein the data types include at least one of: camera data, lidar data, GPS data, and heading data.

12. The method of claim 9, wherein the vehicle operational data includes at least one of vehicle signal data, vehicle diagnostic data, vehicle environmental characteristics, and vehicle operating data.

13. The method of claim 9, wherein the specific previous time period is defined by one or more of a start timestamp, a stop timestamp, a data sequence duration, and a combination thereof.

14. The method of claim 9, further comprising:

receiving, from the remote vehicle, output data generated by the at least first remote vehicle, the output data including the vehicle operational data divided into a plurality of data chunks.

15. A non-transitory computer-readable medium having processor-executable instructions stored thereon, the medium comprising:

instructions to receive, from a remote vehicle, a low-bandwidth data stream including information associated with real-time operation of the remote vehicle, the low-bandwidth data stream comprising telemetry data of a small size suitable for the low-bandwidth interface;

instructions to receive, from an operator console associated with a remote monitoring system, a selection of a specific previous time period of the operation of the remote vehicle for further inspection;

instructions to transmit, to the remote vehicle, a data request for vehicle operational data stored by the remote vehicle and associated with the specific previous time period to be uploaded by the remote vehicle to a server, the vehicle operational data generated by at least a first sensor of the remote vehicle, wherein the vehicle operational data is of a larger size than the telemetry data and unsuitable for the low-bandwidth data stream;

receiving from the server a data package comprising the vehicle operational data associated with the specific previous time period; and using the received data package, simulating operation of the remote vehicle during the specific previous time period.

16. The computer-readable medium of claim 15, wherein the data request further includes a request for one or more specific data types during the specific previous time period.

17. The computer-readable medium of claim 16, wherein the data types include at least one of: camera data, lidar data, GPS data, and heading data.

18. The computer-readable medium of claim 15, wherein the vehicle operational data includes at least one of vehicle signal data, vehicle diagnostic data, vehicle environmental characteristics, and vehicle operating data.

19. The computer-readable medium of claim 15, wherein the specific previous time period is defined by one or more of a start timestamp, a stop timestamp, a data sequence duration, and a combination thereof.

20. The computer-readable medium of claim 15, further comprising:

instructions to receive, from the remote vehicle, output data generated by the remote vehicle, the output data including the vehicle operational data divided into a plurality of data chunks.

* * * * *